May 23, 1961  R. W. WINN  2,984,882
LINE CONNECTOR AND METHOD OF SECURING A LINE THERETO
Filed Aug. 13, 1958  2 Sheets-Sheet 1
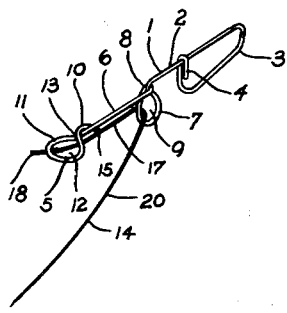
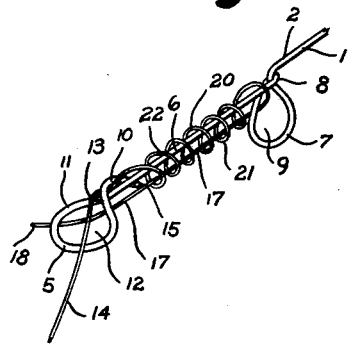
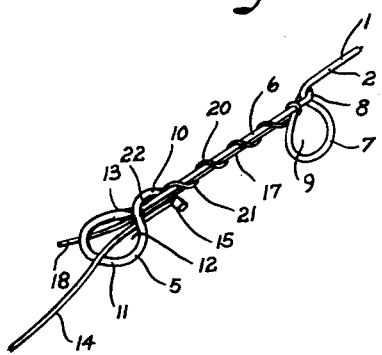
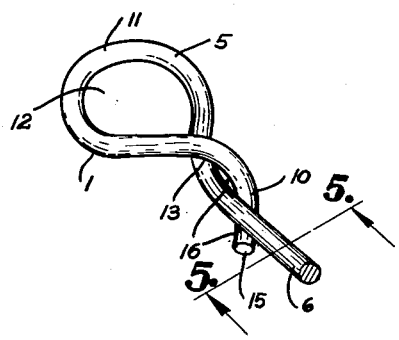
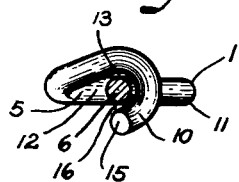
INVENTOR.
Roy W. Winn.
BY
Fishburn and Gold
ATTORNEYS.

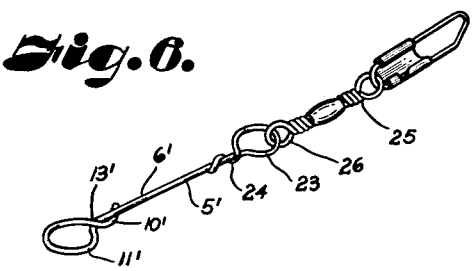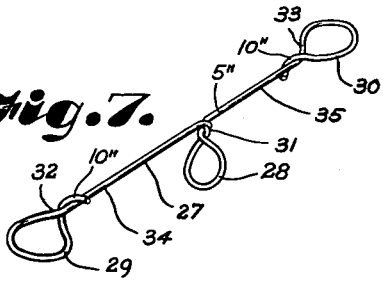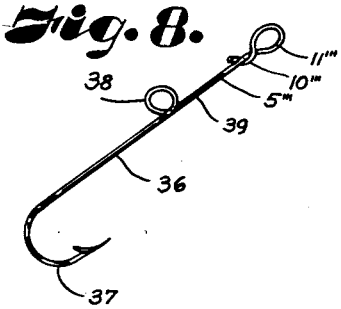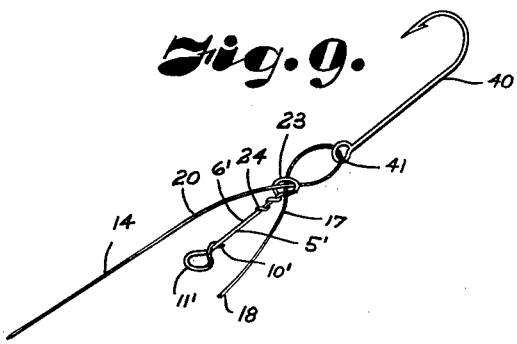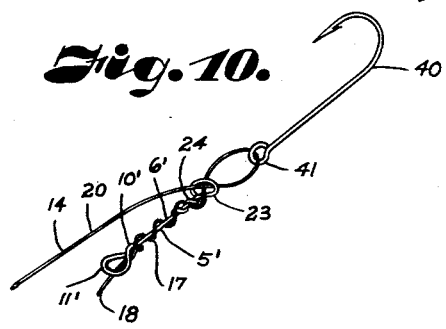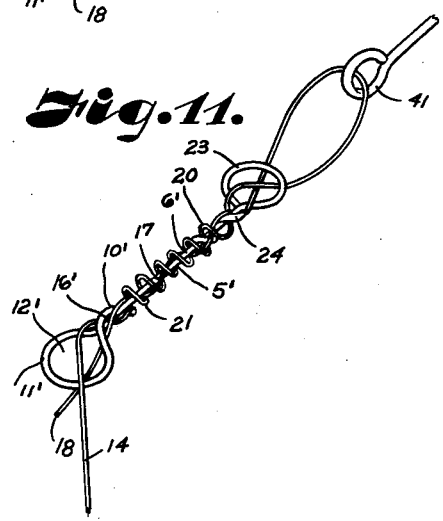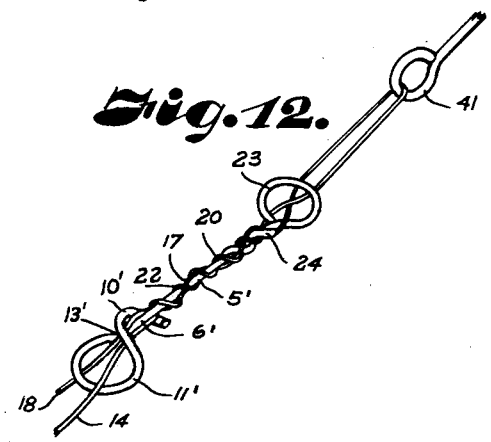

United States Patent Office 2,984,882
Patented May 23, 1961

2,984,882
LINE CONNECTOR AND METHOD OF SECURING A LINE THERETO

Roy W. Winn, 1314 Rogers Ave., Springdale, Ark.

Filed Aug. 13, 1958, Ser. No. 754,769

3 Claims. (Cl. 24—131)

This invention relates to a line connector having means for securing a line thereto and more particularly to a device for connecting the free end of a flexible line or cord such as fishing line to another line such as leader line or an article such as a fish hook or other similar article to form a connection characterized by the absence of a knot in said connection.

The usual practice in connecting a fishing line to a fish hook is to insert the fishing line through the eye of the fish hook and tying a knot therein, and also in connecting the fishing line to a leader line, the connection is made by tying a knot with the free end, or ends, of the respective lines. It is well known that the knotting method causes a weakening of the line at the knotted portion, probably because of a resulting chafing of the line and the additional stress thereon due to twisted portions which bind, and frequently results in the loss of the lure as well as the fish thereon. Furthermore, it is difficult to tie a proper knot with a fishing line, and particularly with a leader line, due to their physical characteristics and also as the fisherman's hands are usually wet and slick from handling bait or the like.

A number of devices have been used in connection with fishing tackle for reducing the strain on the knotted portion, but all of such devices still require forming at least one knot with the free end of the line. Although some of these devices tend to reduce the strain on the knotted portion, the knotted portion is still the weakest point in the fishing line and is still difficult to form.

The objects of the present invention are to provide means for easily connecting one line to another or a line to an article such as a fish hook or the like without forming a knot; to provide a tie member having a shank with a closed eye and an eye trap or line holder portion spaced thereon wherein the free end portion of the line is threaded through the eye and laid along said shank toward the eye trap and the line then spiralled or wound about the shank and said free end portion of the line and pulled into the eye trap portion whereby the line extends through the eye trap portion to secure the line to said tie member; to provide a line and leader tie having an eye trap or line holder portion formed integrally with the tie member shank by a partial spiral of said shank with a point on said spiral portion in resilient engagement with the shank to define a trap; to provide a member having a trap line holder at both ends with a closed eye positioned therebetween for connecting a fishing line to a leader line; to provide an eye and eye trap or line holder portion formed integrally with the shank of a fish hook or the like; and to provide a tie member which is economical to manufacture and simple to use.

Further objects of the present invention are to provide a means for securing a line on a tie member without forming a knot and to provide a means for securing a fish hook or the like on the free end of a line using a tie member, with the tie member being in spaced relation from the fish hook.

Other objects and advantages of this invention will become apparent from the following description taken in connection with the accompanying drawings, wherein are set forth by way of illustration and example certain embodiments of this invention.

Fig. 1 is a perspective view of a line connector or tie member formed integrally with a snap fastener.

Fig. 2 is an enlarged fragmentary perspective view of the tie member and snap fastener showing the line spiralled about the shaft of the tie member, with the line outside of the eye trap or line holder.

Fig. 3 is an enlarged fragmentary perspective view of the tie member showing the line spiralled about the shank and the free end portion of the line, with the line pulled tight into the eye trap portion to secure the line thereon.

Fig. 4 is an enlarged fragmentary perspective view of the eye trap portion.

Fig. 5 is a cross sectional view through the trap or line holder portion taken on a line 5—5, Fig. 4.

Fig. 6 is a perspective view of a modified form of my invention showing an article such as a fishing tackle swivel and fastener connected to the eye portion of the tie member.

Fig. 7 is a perspective view of a further modified form of my invention illustrating a tie member having an eye trap portion at both ends for connecting a fishing line to a leader line.

Fig. 8 is a perspective view of another modified form of my invention showing the tie member formed integrally with the shank of the fish hook.

Fig. 9 is a perspective view of a further modified form of my invention illustrating the first step for connecting a fishing line or the like to a fish hook by use of a tie member, with the free end of the line being threaded through the eye of the tie member and the eye of the fish hook and back through the eye of the tie member to form a loop between the tie member and the fish hook.

Fig. 10 is a view similar to that of Fig. 9, illustrating the second step, with the free end of the line being coiled about the shaft of the tie member.

Fig. 11 is a view similar to that of Fig. 9, showing the third step, the line being coiled about the shaft of the tie member and the free end of the line, with the line outside of the eye trap portion.

Fig. 12 is a view similar to that of Fig. 11 with the line pulled tight into the eye trap portion thereof to secure the line to the fish hook.

Referring more in detail to the drawings:

1 designates a connector or fastening member for flexible lines and the structure illustrated is an embodiment thereof particularly adapted for connecting fishing lines to fishing tackle devices, lures, or the like. The fastening member 1 for connecting fishing lines is preferably composed of a light spring wire having a shank 2 with a reversely turned portion 3, with the extremity being formed into a snap catch 4 for detachable engagement with the shank 2 to form a spring fastener at one end portion of said shank. A tie member 5 is preferably formed integrally with the shank 2, and has a straight shank portion 6 preferably being an extension of the shank 2 and extending coaxially therewith, with a closed ring or loop or transverse portion 7 formed at the juncture of the shank portion 6 and shank 2 in spaced relation from the catch 4. The closed ring 7 may be formed by a twist 8 in the shank portion 6 providing an eye or opening 9 in the ring 7. The extreme end of the shank portion 6 remote from the closed ring 7 is turned toward the ring 7 and terminates in a partial spiral end portion 10 forming an eye trap member or line holder portion 11 having an opening or eye 12. The partial spiral end portion 10 lies against the shank portion 6 in the area as indicated at 13 but the wire is resilient so that it will move apart to allow a fishing line or the like 14 to pass therebetween. The spiral end portion 10 is in spaced relation to the closed ring 7 whereby the fishing line 14 may be coiled around the shank portion 6 between the ring 7 and the partial spiral end portion 10 as hereinafter described. The partial spiral end portion 10 terminates in an end 15 slightly spaced from and extending beyond the shank 6. The line 14 may be hooked over the end 15 and the line 14 then guided by the spiral end portion 10 into said eye 12 through a passageway 16 formed between the end portion 10 and the shank portion 6 (Fig. 5). The spiral end portion 10 may actually resiliently engage the shank portion 6 at the area indicated by 13, causing the passageway 16 to be normally closed when a material having sufficient flexibility is used so that the passageway 16 may be resiliently opened to permit a line 14 to pass therethrough. However, when heavy material with little or no flexibility is used the spiral end portion 10 does not actually engage the shank but is spaced therefrom slightly so that the line 14 may be hooked over the end 15 of the wire and the line pulled through the open passageway 16 into said eye 12. The line is prevented from slipping out of the open passageway 16 due to the close proximity and tortuous path between the spiral portion 10 and the shank portion 6 which prevents the line from moving through the passageway 16 except by a positive act as hereinafter described.

The method for securing the free end portion 17 of the fishing line 14 to the tie member 5 of the connector 1 is clearly shown in Figs. 1 to 3 inclusive, and comprises passing the free end portion 17 of the end 18 of the line 14 through the opening 9 of the closed ring 7 and extending the said line portion 17 along the tie member shank portion 6 with the end 18 of the line 14 preferably extending slightly beyond the trap portion 11, as shown at Figs. 1 to 3 inclusive. The end 18 of the line is held in place, and a portion 20 of the line 14, which is adjacent the ring but not having passed through the opening 9, is wrapped around the shaft 6 and the free end portion 17, at least two turns and preferably six or more turns, depending upon the type of line used, as shown in Fig. 2. Coils 21 are formed in a substantially helical spiral by the turns or wraps of the line portion 20, and are wrapped in the same circumferential direction as the partial spiral end portion 10 of the trap member 11 going toward the end 15, whereby tension on the line 14 away from the transverse portion 7 tends to move the line 14 through the passageway 16 into the eye 12 as shown in Fig. 3. Further tension on the line 14 causes tight binding engagement with the shank 6, as indicated at 22. The coils 21 bind the line portion 17 to the shank portion 6 and tension on the line 14 increases the tightness and frictional engagement of said coils and line portion 17. The line remains well secured by frictional engagement on the shank 6 and in the trap portion 11 when the tension thereon is released. It will be obvious that the tie having several turns, as herein described, is secure against slippage, but has no knot of any kind therein, and the coils 21 of the line 14 are spaced apart on the shank portion 6 when the line 14 is pulled tight which distributes line wear over a large portion of the coils and separates the coils so that chafing due to relative movement is substantially eliminated. Once the line is pulled into the trap portion 11 it remains secure as the unwinding tendency in the line 14 and the partial spiral end portion 10 of the trap portion 11 oppose each other. To disengage the line 14 from the tie member 5, the line extending through the opening 12 of the trap portion 11 is pulled toward the end of the passageway 16 adjacent the opening 12, and aligned with said passageway 16. The line is then pulled toward the ring 7, which forces it through the passageway 16 and may then be unwound.

A modified form of my invention is shown in Fig. 6 wherein the tie member 5' has a shank portion 6' and trap or line holder portion 11' at one end thereof with a partial spiral portion 10', substantially the same as in the form of my invention shown in Fig. 1, and has a closed ring 23 formed on the end of the shank portion 6' remote from the trap portion 11' by making a loop in the end of shank portion 6' and wrapping the end tightly around the shank 6' as indicated at 24. An article of fishing tackle 25 such as a swivel and fastener, hook, sinker or the like, having an eye 26 is secured on the tie member 5' with the eye 26 and the ring 23 being interlocked. The method of securing the free end of the line 14 on the tie member 5' is substantially identical with the method hereinbefore described, and therefore, will not be repeated.

Another modified form of my invention is shown in Fig. 7, which is particularly useful for making the connection between a fishing line and a leader line. The tie member 5'' has an elongate shank 27 with a closed ring 28 formed substantially midway between ends 29 and 30 thereof by a twisted portion 31 substantially the same as the twisted portion 8 in the form of my invention shown in Fig. 1. The ends 29 and 30 of the shank 27 are formed into trap or line holder members 32 and 33 respectively, with the spiral portions 10'' turned toward the closed ring 28, and are substantially identical in construction to the trap member 11 described in the form of my invention illustrated in Figs. 1 to 5 inclusive. In making the connection between a fishing line and a leader line, the free end of the fishing line is passed through the ring 28 and laid along one end portion 34 of the shank 27 and then the line is wrapped about said one end portion 34 and secured in the trap portion 32 by the method hereinbefore described in reference to the structure shown in Figs. 1 to 5 inclusive. The free end of a leader line is also passed through the ring 28, laid along the other end portion 35 of the shank 27 and the line then wrapped about said end portion 35 and secured in the trap portion 33, also by the method hereinbefore described in reference to the form shown in Figs. 1 to 5 inclusive. It can readily be seen that a non-slip connection between the fishing line and the leader line may quickly and easily be made without tying a knot, which is particularly advantageous due to the physical characteristics of leader line material which gives it a tendency to slip out of a knotted engagement.

Another modified form of my invention is shown in Fig. 8, wherein the tie member 5''' is formed integrally with the shank 36 of a fish hook 37. A ring 38 for the tie member 5''' is formed by making a loop substantially midway of the length of the shank 36, with a portion 39 of the shank 36 forming the shank portion of the tie member 5'''. The shank portion 39 extends substantially coaxially with the shank 36 and has the trap or line holder member 11''' formed in the end thereof as hereinbefore described in reference to the structure shown in Figs. 1 to 5 inclusive. The method of securing the line 14 to the tie member 5''' is substantially identical to that described relative to the form of my invention shown in Figs. 1 to 5 inclusive and will not be repeated here.

A further modified form of my invention is shown in Figs. 9 to 12 inclusive, and has a tie member 5' substantially identical to the tie member shown in Fig. 6, with the tie member 5' being separate from the article of fishing tackle 40. The method of securing the line 14 to the fishing tackle 40, and using the tie member 5', is by passing the portion 17 of the free end of the line 14 through the closed ring 23 of the tie member 5' and through the eye 41 of the fishing tackle 40 and returning the portion 17 through the ring 23 of the tie member 5', with the end 18 preferably extending past the trap member 11', as shown in Fig. 9. The free end portion 17 is then wrapped around the shank portion 6' preferably six or more times in the same circular direction as that of the spiral portion 10', but from the opposite end of the shank portion 6', as shown in Fig. 10. The portion 20 of the line 14 is then wrapped around the shank portion 6' and portion 17 of the line to form the coils 21 as hereinbefore described, and is pulled tight through the passageway 16' and the closely spaced area indicated at 13' into the clip portion 11' to secure the line 14 on the tie member 5' (Figs. 11 and 12). The helical wraps of the free end portion 17 about the shank portion 6' are crossed by opposite wraps of the line portion 20 which prevents any slippage in the line 14 on the time member 5', and thereby permit the fishing tackle 40 to be spaced from the ring 23 at any desired distance.

Although I have shown and described a tie member in connection with use in the art of fishing, it is obvious that a tie member constructed as herein described could be used in many different arts remote from fishing, and wherein it is desirable to have a connection between two lines or a line and an article, free of knotted portions.

What I claim and desire to secure by Letters Patent is:

1. The combination of a tie member and a flexible line for making a knotless connection with the free end portion of said flexible line comprising, an elongate piece of wire having a transversely extending part at one end and an eye member at the other end with the wire between the transverse part and the eye member defining a straight shank, said eye member being defined by said wire being bent in a loop at said other end of the shank with an end portion of said wire partially spiralled around said shank adjacent said eye member and terminating in an end lying close to but spaced from and extending beyond said shank to allow the line to be guided by said end portion of said wire into said eye member, one end of the flexible line connected to the tie member being adjacent said eye member with said line extending alongside of the shank and around the transverse part and then being wrapped around the shank and said flexible line alongside said shank in a spiral toward said eye member, said line being wrapped around the shank in the same circumferential direction as the spiral of the wire toward said end of said end portion of said wire, said wrapping continuing substantially to said end portion of said wire adjacent said eye member and then extended between said end portion of said wire and the shank and into said eye member whereby pulling on the line beyond said eye member in a direction opposite from the transverse part on the shank will cause said wrapping to tighten on the shank portion of the line to secure same against slippage.

2. The combination of a tie member and a flexible line as in claim 1 in which said line extending alongside of the shank is spiralled around said shank.

3. The combination of a tie member and a flexible line making a knotless connection with the free end portion of said flexible line comprising, an elongate piece of wire having a ring extending from one end and an eye member at the other end with the wire between the ring and the eye member defining a straight shank, said eye member being defined by said wire being bent in a loop at said other end of the shank with an end portion of said wire partially spiralled around said shank adjacent said eye member and terminating in an end lying close to but spaced from and extending beyond said shank to allow the line to be guided by said end portion of said wire into said eye member, one end of the flexible line connected to the tie member being adjacent said eye member with said line extending alongside of the shank and through said ring and then being wrapped around said shank and said flexible line alongside said shank in a spiral toward said eye member, said line being wrapped around the shank in the same circumferential direction as the spiral of the wire toward said end of said end portion of said wire, said wrapping continuing substantially to said end portion of said wire adjacent said eye member and then extended between said end portion of said wire and the shank and into said eye member whereby pulling on the line beyond said eye member in a direction opposite from said ring on the shank will cause said wrapping to tighten on the shank portion of the line to secure same against slippage.

References Cited in the file of this patent

UNITED STATES PATENTS

| | | |
|---|---|---|
| 810,306 | Robins | Jan. 16, 1906 |
| 895,493 | O'Brien | Aug. 11, 1908 |
| 1,471,959 | Halferty | Oct. 23, 1923 |
| 2,173,750 | Braconi | Sept. 19, 1939 |
| 2,222,277 | Baker | Nov. 19, 1940 |
| 2,665,516 | Race | Jan. 12, 1954 |
| 2,754,615 | Toil | July 17, 1956 |